United States Patent [19]

Johnson

[11] Patent Number: 4,465,649
[45] Date of Patent: Aug. 14, 1984

[54] METHOD AND SYSTEM FOR EXTRUDING TUBULAR FOAMED POLYMER SHEET

[75] Inventor: David E. Johnson, Canandaigua, N.Y.

[73] Assignee: Mobil Oil Corporation, New York, N.Y.

[21] Appl. No.: 450,852

[22] Filed: Dec. 20, 1982

[51] Int. Cl.³ .................. B29D 27/00; B29D 23/04
[52] U.S. Cl. ..................... 264/51; 264/178 R; 264/209.4; 425/67; 425/325; 425/817 C; 425/DIG. 2
[58] Field of Search ........... 264/51, 53, 45.5, 209.4, 264/178 R; 425/67, 325, DIG. 2, 817 C

[56] References Cited

U.S. PATENT DOCUMENTS

| | | | |
|---|---|---|---|
| 2,987,765 | 6/1961 | Cichelli | 425/DIG. 2 |
| 3,426,111 | 2/1969 | Simpson | 264/51 X |
| 3,864,444 | 2/1975 | Johnson | 264/48 |
| 4,160,638 | 7/1979 | Kolossow | 264/51 X |
| 4,352,893 | 10/1982 | Johnson et al. | 264/45.5 X |

*Primary Examiner*—Philip E. Anderson
*Attorney, Agent, or Firm*—Alexander J. McKillop; Michael G. Gilman; Charles J. Speciale

[57] ABSTRACT

A process and system for the formation of a polymer foam sheet of comparatively uniform biaxially orientation and comparatively uniform dimensions prepared by extruding polymer foam so that it rides on a fluid bearing film between the point of extrusion and a point of diameter expansion of the extruding tube.

21 Claims, 2 Drawing Figures

METHOD AND SYSTEM FOR EXTRUDING TUBULAR FOAMED POLYMER SHEET

BACKGROUND OF THE INVENTION

The present invention concerns a process and system for the extrusion of a foamed polymer sheet into a cooling atmosphere and over a diameter expanding sizing drum. More specifically, this invention concerns a process and system for the formation of tubular polymer foamed sheet of high dimensional uniformity and of at least substantially uniform orientation.

In U.S. Pat. Nos. 3,864,444 and 4,352,893 there is disclosed processes and systems for the extrusion of tubular polystyrene into a water bath, which water bath may either be boiling or at a temperature below the boiling point of water. After passing through the water bath, the tubular extruded polystyrene passes over a diameter expanding sizing drum which is designed to give the extruded tube a uniform internal diameter. While this system is described primarily for the vertical extrusion of polystyrene and the passage of the tubular extrudate vertically up through a bath of water, it has been found that the process and apparatus can be advantageously employed for horizontal extrusion of the tubular polystyrene foam sheet.

Polystyrene foam sheet also is conventionally extruded into air as the cooling atmosphere between the die and the sizing drum.

When employing the system for horizontal extrusion into a water bath, the water is usually employed externally of the polystyrene foam tube. In so processing horizontally extruded polystyrene, a problem was observed downstream during the thermoformation of the foamed polystyrene into desired parts. After the tubular foam polystyrene sheet is formed it is slit open to form a flat sheet. Following an appropriate aging technique, the polystyrene foam sheet is ready for thermoformation into any desired product, for example, egg cartons, sandwich containers, coffee cups, etc. Prior to the actual thermoformation step, the foam sheet is preheated and during this preheating step, buckling and sagging has been observed across the width of the sheet. It has been determined that this problem is caused by a nonuniformity in orientation in the foam sheet in combination with slight variations in cross-sectional dimension. Analysis of the problem has resulted in a determination that the cause stems from the difference in water pressure in the water bath as the extruded tube passes therethrough. Because the water pressure is greater at the bottom of the water bath than at the top, the extruded tube, which at this point contains an air bubble, is distorted because of the difference in pressure. Thus, instead of the extruded polymer being the projection of an expanding perfect circle, it is the projection of an imperfect circle. This imperfection becomes set in the extruded polymer foam sheet and the result is a sheet which has nonuniform biaxial orientation and can in some instances contain unwanted dimensional differences.

It is an object of this invention to present a process for the production of polymer foam sheet extrudate having uniform dimensions and uniform orientation.

A further object of this invention is to present a system for the production of a foam sheet extrudate having uniform biaxial orientation and dimensions.

Yet another object of this invention is to present a process and system for the gas or liquid cooled extrusion of polymeric foam sheet.

SUMMARY OF THE INVENTION

Figure 1:
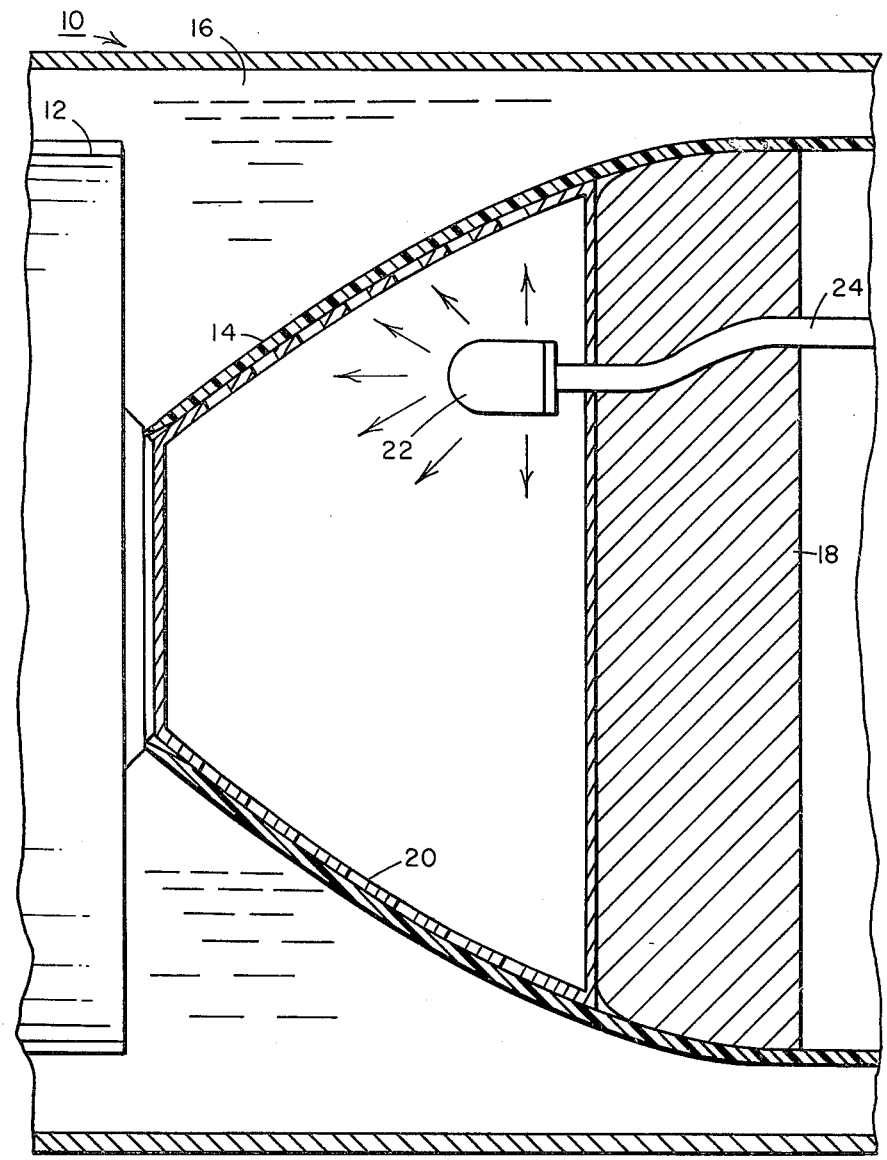
FIG. 1 is a cross sectional view of an apparatus or system adapted to perform the method of this invention.

The present invention is directed to a method for preparing a foamed polymeric sheet of uniform dimensions and orientation comprising:

(a) extruding a composition comprising a molten polymer containing a foaming agent through an annular die;

(b) passing the extruding tube over a diameter-increasing sizing member spaced from said die;

(c) positioning an envelope within said tube between said die and said sizing drum, said envelope having a perforated conical shaped wall conforming to the slope of the extruding tube and spaced closely adjacent thereto, the remainder of said envelope being imperforate; and (d) maintaining a positive fluid pressure within said envelope so as to cause said tube to ride from said die to over said sizing drum on a uniformly thin layer of fluid maintained by a uniform pressure drop through said perforated wall.

The present invention also is directed to a system for extruding polymeric foam sheet of at least substantially uniform dimensions and orientation comprising in combination:

(a) means for extruding a composition comprising a molten polymer containing a foaming agent therein through an annular die;

(b) means for drawing the extruding polymer foam in tube form over a diameter-increasing sizing member spaced from said die;

(c) envelope means positioned within said tube between said die and said sizing member, said envelope having a perforated conical shaped wall conforming to the slope of the extruding tube and spaced closely adjacent thereto; the remainder of said envelope being imperforate; and (d) means for maintaining a positive fluid pressure within said envelope so as to cause said extruding tube to ride from said die to over said sizing drum on a uniformly thin layer of fluid maintained on said perforated wall by a uniform pressure drop through said perforated wall.

In the present process and the system, the envelope is of a rigid material and the the fluid within said envelope, which is under pressure, can be either a gas or a liquid. The gas can be, for example, air or carbon dioxide and the fluid can be water. It is preferred that the fluid be at a relatively cool temperature so as to assist in dissipating the heat of the extruding polymer.

The process in the system also contemplates extruding the polymer composition into a cooling atmosphere which is either a gas or a liquid. In the case of a gas, it can be extruded into air and, in the case of the liquid, it can be extruded directly into a water bath position between the die orifice and the sizing drum.

DETAILED DESCRIPTION OF THE INVENTION

The present process and system can be employed in the production of any polymeric material which can be extruded with a foaming agent to produce a foaming agent to produce a foamed polymer. Polyolefins in general are contemplated but the process and system are best exemplified using a styrenic resin, e.g., polystyrene or poly(p-methystyrene). Broadly, the process involves extruding molten styrene polymer in combination with a blowing agent and a nucleating agent from an annular extrusion die orifice. Upon emerging from the orifice, the tubular extrudate is passed through air at ambient temperature or through water which is maintained at a temperature within a range of from about 30° C. up to about 85° C. and preferably from about 45° C. to about 80° C. The preferred extrusion die temperatures for a styrene polymer ranges from about 120° C. up to about 190° C. and preferably from about 130° C. up to about 175° C. At a short distance down stream from the extrusion orifice the tubular extrudate is drawn over a diameter-enlarging sizing member which fixes the diameter of the tube and causes a biaxial orientation of the now foamed polymer tube. Thereafter the tube is slit and open to a flat sheet after which the sheet can be wound onto a mandrel for subsequent aging prior to conversion of the foam sheet into the desired end product e.g. containers etc.

Referring to FIG. 1 and utilizing polystyrene as an example of the foamed polymer, molten polystyrene is extruded from an annular die orifice system 12 in the shape of a polystyrene foam tube 14. The tube is extruded into a water bath 16 which completely surrounds the extruding tube. The water bath is equipped with an inlet and an outlet (not shown) and the flow rate of the water can be regulated such that a water temperature difference of less than about 5° C. is maintained between the inlet and the outlet. It is preferred to maintain the water temperature at about 30° to 85° C. While being passed through the water the tubular shaped extrudate is first drawn over an envelope 20 which is positioned between the die and a diameter-increasing sizing member 18 and which is closely adjacent the die and sizing member, as shown in FIG. 1. The envelope 20 has a perforated conical shaped wall which conforms to the slope of the extruding tube, said wall being spaced closely adjacent to the internal surface of the extruding tube. The remainder of the envelope is imperforate. In one embodiment this member could have the shape of a covered bowl where the bottom and cover of the bowl is imperforate with the walls of the bowl having perforations therein. A gas diffuser 22 is positioned within envelope 20 and is fed by a positive pressure tube 24 which is in communication with some positive pressure source not shown. In the instance where the fluid within the envelope 20 is a liquid then any appropriate means is employed to bring the liquid within envelope 20 under appropriate pressure so that a film of liquid is forced through the perforations.

As indicated, the envelope 20 is made of any rigid material, for example, metal, polymer, etc. The perforations or openings in the wall of the envelope which face the inner surface of the extruding foamed polymer must be such as will permit the fluid within the envelope to be transmitted to the outside of the perforated wall of the envelope. In this manner, the fluid under positive pressure forms a uniform film between the perforated wall and the extruding foamed polymer. The foamed polymer rides on this uniformly thin fluid film from about the point of extrusion from the die orifice to the diameter-enlarging member 18. In this manner little or no drag is experienced between the extruding polymer and the surface of the envelope. The extruding polymer tube, between the die and the diameter-expanding member, assumes the shape of a projected expanding perfect circle. The temperature of the fluid should be sufficiently low so as to assist in removing some of the heat from the hot foam polymer as it progresses to the sizing drum 18.

As an example of a suitable envelope a structure can be formed having the cross-sectional shape illustrated in FIG. 1. The structure can be made of metal or rigid polymer having a wall thickness of approximately 0.060 inches and the perforations in the wall of the envelope can be equivalent to a 0.04% mesh opening which in turn is equivalent to a 0.023 mol O orifice for each square inch of envelope wall facing the interior surface of the extruding tube. In a typical case the total conical fluid bearing area can be approximately 129 square inches. At 2 psig air supply, this perforated envelope passes 10 SCFM of air to bearing support the extruding foam.

Figure 2:
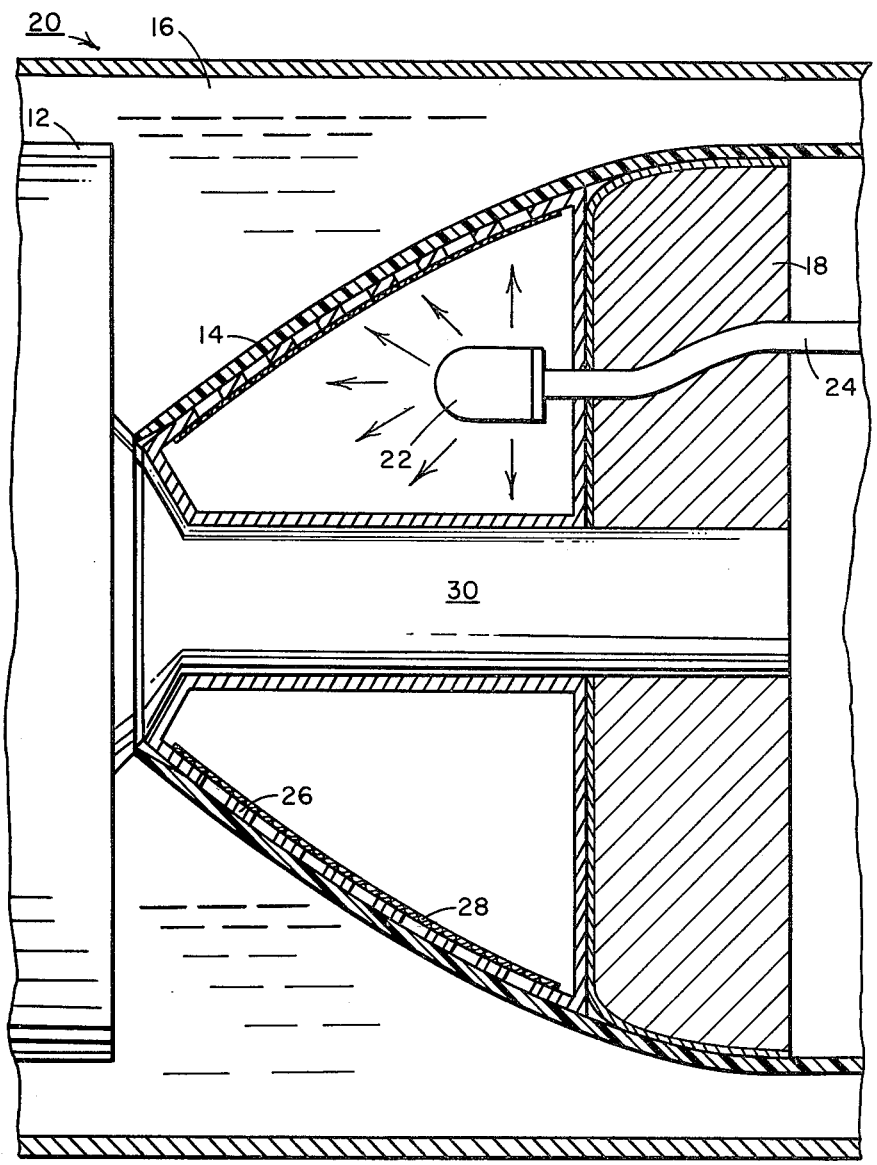
FIG. 2 represents a cross-sectional view of another apparatus or system adapted to perform the method of this invention.

FIG. 2 shows a system 20 which is essentially the same as that of FIG. 1 except that the envelope comprises two members, an outer member 26 and an inner member 28. The outer member 26 is a cone shaped envelope supported by a central shaft 30. The wall of the envelope facing the extruding foamed polymer has gross or comparatively large openings therein. The inner member 28 is a flexible member in face to face contacting relationship with the wall of the envelope having the larger holes. Member 28 is flexible and cone shaped conforming to the configuration of the outer wall of the envelope. The outer member 26 can be of metal or rigid polymer and inner member 28 can be of any flexible material, for example, thin metal sheet, thin polymer, fabric, etc. By way of example, the outer portion of the envelope can be of mild steel with a wall thickness of about 0.059 inches having a 40% open area in the exterior wall facing the extruding polymer foam. This open area is equivalent to 33 holes each of 0.125 mils O per square inch. Positioned within this structure and in conforming contact to the perforated wall thereof is a sail cloth fabric having a 0.042% mesh opening or the equivalent of a 0.023 mil O orifice for each square inch of cloth area. As in FIG. 1, the total conical fluid bearing area is 129 square inches, with 52(129 times 0.4) square inches of sail cloth exposed through the 0.125 mil perforations. At 2 psig air supply this area of sail cloth passes 10 scfm of fluid to support the foam.

The envelopes described can be manufactured and assemblied in any manner within the skill of the art. The sizing member can be water or air cooled to assist in cooling the extruding tube.

As indicated above, the system of FIGS. 1 and 2 can be employed without the use of cooling water bath 16. When the polymer is extruded into a cooling gaseous atmosphere, for example air, the present invention can supply either gas or liquid as the bearing surface between the extruded tube and the envelope. Similarly when the polymer is extruded into a cooling fluid, for example water, the extruding polymer foam tube can ride on either a gaseous or a liquid bearing layer. In either case the resulting foamed polymer sheet will be found to have a comparatively uniform biaxial orientation and be of comparatively uniform dimensions.

What is claimed is:

1. A method for the production of polymeric foam sheet of uniform dimensions and orientation comprising:
    (a) extruding a composition comprising a molten polymer containing a foaming agent therein through an annular die;
    (b) passing the extruding tube over a diameter-increasing sizing member spaced from said die;
    (c) positioning an envelope within said tube between said die and said sizing drum, said envelope having a perforated conical shaped wall conforming to the slope of the extruding tube and spaced closely adjacent thereto, the remainder of said envelope being imperforate, said perforated conical shaped wall extending from adjacent said annular die to adjacent said sizing member; and
    (d) maintaining a positive fluid pressure within said envelope so as to cause said tube to ride from said die to over said sizing drum on a uniformly thin layer of fluid maintained by a uniform pressure drop through said perforated wall.

2. The method of claim 1 wherein said fluid is a liquid.

3. The method of claim 2 wherein said liquid is water.

4. The method of claim 1 wherein said fluid is a gas.

5. The method of claim 4 wherein said gas is air.

6. The method of claim 4 wherein said gas is carbon dioxide.

7. The method of claim 1 wherein said fluid is relatively cool to remove heat from the extruding tube.

8. The method of claim 1 wherein said polymer is a styrene polymer.

9. The method of claim 8 wherein said styrenic polymer is polstyrene or poly (p-methylstyrene).

10. A system for extruding polymeric foam sheet of at least substantially uniform dimensions and orientation comprising in combination:
    (a) means for extruding a composition comprising a molten polymer containing a foaming agent therein through an annular die;
    (b) means for drawing the extruding polymer foam in tube form over a diameter-increasing sizing member spaced from said die;
    (c) envelope means positioned within said tube between said die and said sizing member, said envelope means having a perforated conical shaped wall conforming to the slope of the extruding tube and spaced closely adjacent thereto, the remainder of said envelope being imperforate, said perforated conical shaped wall extending from adjacent said annular die to adjacent said sizing member;
    (d) means for maintaining a positive fluid pressure within said envelope so as to cause said extruding tube to ride from said die to over said sizing drum on a uniformly thin layer of fluid maintained on said perforated wall by a uniform pressure drop through said perforated wall.

11. The system of claim 10 wherein said envelope is of a rigid material.

12. The system of claim 10 wherein the perforations of said conical shaped wall are of comparatively large diameter and on the inside surface of said conical shaped wall and in conforming abutment therewith is a flexible sheet member having perforations of comparatively small diameter.

13. The system of claim 12 wherein said flexible sheet is a woven fabric.

14. The system of claim 10 including means between said die and sizing member for extruding said polymer into a cooling atmosphere.

15. The system of claim 14 wherein said cooling atmosphere is a liquid or a gas.

16. The system of claim 15 wherein said gas is air.

17. The system of claim 15 wherein said means is a water bath.

18. The system of claim 10 wherein said positive fluid pressure means is a comparatively cool gas means.

19. The system of claim 18 wherein said cool gas means is air or carbon dioxide.

20. The system of claim 10 wherein said positive fluid pressure means is a comparatively cool liquid means.

21. The system of claim 20 wherein said cool liquid means is water.

* * * * *